US008660011B2

(12) United States Patent
Carroll

(10) Patent No.: US 8,660,011 B2
(45) Date of Patent: Feb. 25, 2014

(54) INTELLIGENT JACK PROVIDING PERCEPTIBLE INDICATION OF NETWORK CONNECTIVITY

(75) Inventor: Martin D. Carroll, Watchung, NJ (US)

(73) Assignee: Alcatel Lucent, Paris (FR)

( * ) Notice: Subject to any disclaimer, the term of this patent is extended or adjusted under 35 U.S.C. 154(b) by 522 days.

(21) Appl. No.: 12/883,644

(22) Filed: Sep. 16, 2010

(65) Prior Publication Data

US 2012/0069743 A1 Mar. 22, 2012

(51) Int. Cl.
*G01R 31/08* (2006.01)
*G01F 11/00* (2006.01)
*G08C 15/00* (2006.01)

(52) U.S. Cl.
USPC .......................................................... 370/241

(58) Field of Classification Search
USPC .................. 370/241; 439/620.01, 620.03
See application file for complete search history.

(56) References Cited

U.S. PATENT DOCUMENTS

| 5,062,131 A | | 10/1991 | Kanare et al. |
| 5,692,925 A | | 12/1997 | Borgese, II |
| 6,028,923 A | * | 2/2000 | Kolb et al. ............... 379/216.01 |
| 6,429,779 B1 | | 8/2002 | Petrillo et al. |
| 7,453,989 B1 | * | 11/2008 | Carbain ..................... 379/27.01 |
| 7,675,922 B2 | * | 3/2010 | Magendanz et al. .......... 370/401 |
| 2006/0047800 A1 | * | 3/2006 | Caveney et al. .............. 709/223 |
| 2006/0165110 A1 | * | 7/2006 | Magendanz et al. .......... 370/419 |
| 2006/0244462 A1 | * | 11/2006 | McCosh et al. ............... 324/522 |
| 2009/0070441 A1 | * | 3/2009 | Karlov et al. ................. 709/220 |
| 2010/0250788 A1 | * | 9/2010 | Chen et al. ....................... 710/10 |
| 2011/0044347 A1 | * | 2/2011 | Taylor et al. .................. 370/401 |
| 2011/0141921 A1 | * | 6/2011 | Reese et al. ................... 370/252 |

FOREIGN PATENT DOCUMENTS

| CN | 2641935 | 9/2004 |
| WO | 02/080311 A1 | 10/2002 |

* cited by examiner

*Primary Examiner* — Farah Faroul
(74) *Attorney, Agent, or Firm* — Ryan, Mason & Lewis, LLP

(57) ABSTRACT

An intelligent network jack configured for connection to a communication network includes a housing, an input connector, an output connector adapted for coupling to the communication network, processing circuitry arranged within the housing and operative to perform a test for connectivity between the network jack and the communication network, and a display for presenting a result of the connectivity test in a user-perceptible manner. In one embodiment, the network jack comprises an in-wall network jack configured for installation with the housing primarily on one side of a wall and with at least the input connector and display accessible on an opposite side of the wall. In another embodiment, the network jack comprises an adaptor network jack with the output connector configured for insertion into an input connector of an existing conventional in-wall network jack.

18 Claims, 3 Drawing Sheets

INTELLIGENT JACK PROVIDING PERCEPTIBLE INDICATION OF NETWORK CONNECTIVITY

FIELD OF THE INVENTION

The present invention relates generally to communication equipment, and more particularly to a network jack that provides connectivity to a communication network.

BACKGROUND OF THE INVENTION

Network jacks, such as conventional RJ45 wall jacks, are configured to provide connectivity to a communication network. Unfortunately, that connectivity can become lost or otherwise deviate from its desired condition, for a variety of different reasons. For example, a cable behind the network jack can get unplugged from a switch or other network device at the other end of the cable. As another example, a remote switch, or something in the network behind such a switch, can become damaged or misconfigured in any number of ways. Unfortunately, when using conventional network jacks such as the typical RJ45 wall jacks noted above, it is impossible to determine by looking at the jack whether it is still providing the desired network connectivity.

One known approach to determining the network connectivity of a conventional network jack is to plug a network tester into the jack. These devices perform various tests on the network behind the jack and report the results. However, there are at least two problems with using existing network testers to determine jack connectivity. First, these devices are expensive, with many units costing on the order of several thousands of dollars. Hence, the network testers typically must be shared among multiple groups of users within a given facility. Second, these devices can take upwards of half a minute to fully test the network connectivity of a single network jack. Thus, the amount of time required for periodically verifying the functionality of all the network jacks within a particular computer lab or other facility can be prohibitive, and as a result such verifications are generally not performed. Instead, network administrators or technicians often just wait until something stops working, and then have to hunt slowly and tediously for a jack that has lost proper connectivity.

Accordingly, what is needed is an improved approach to determining network connectivity of network jacks.

SUMMARY OF THE INVENTION

Illustrative embodiments of the present invention provide intelligent network jacks that overcome the above-described drawbacks of conventional jacks.

In one aspect of the invention, an intelligent network jack configured for connection to a communication network includes a housing, an input connector, an output connector adapted for coupling to the communication network, processing circuitry arranged within the housing and operative to perform a test for connectivity between the network jack and the communication network, and a display for presenting a result of the connectivity test in a user-perceptible manner. The processing circuitry may periodically test for connectivity between the network jack and the communication network at specified intervals. A given such test for connectivity may comprise, for example, verifying that the network jack is connected to a functioning network device of the communication network, determining a subnet address or other identifier of communication network, or determining whether a dynamic host configuration protocol (DHCP) address can be acquired and if so acquiring the DHCP address.

The processing circuitry of the intelligent network jack may comprise, for example, a processor coupled between the input connector and the output connector, a first physical layer device coupled between the input connector and the processor, and a second physical layer device coupled between the processor and the output connector. The processor may include a DHCP client, a multiplexer for directing communications between the DHCP client and the first and second physical layer devices, and control logic coupled to the DHCP client and the multiplexer.

The display of the intelligent network jack may present an indication of whether or not the network jack is connected to a functioning network device of the communication network. Alternatively or additionally, the display may present a subnet address or other identifier of the communication network, an inferred network address, an acquired DHCP address, or an indication that no DHCP server has been detected.

In a first illustrative embodiment, the network jack comprises an in-wall network jack configured for installation with the housing primarily on one side of a wall and with at least the input connector and display accessible on an opposite side of the wall.

In a second illustrative embodiment, the network jack comprises an adaptor network jack with the output connector configured for insertion into an input connector of an existing conventional in-wall network jack.

The intelligent network jacks in the illustrative embodiments automatically perform connectivity testing in an accurate and efficient manner without the excessive cost and delay associated with use of conventional network testers and without requiring the intervention of a network administrator or technician. The test results are presented on the jack itself in a manner that allows users to easily detect and diagnose connectivity problems.

These and other features and advantages of the present invention will become more apparent from the accompanying drawings and the following detailed description.

DETAILED DESCRIPTION OF THE INVENTION

The invention will be described herein in conjunction with illustrative embodiments of network jacks and associated processing hardware and software. It should be understood, however, that the invention is not limited to use with the particular elements described, but is instead more generally applicable to any network jack application in which it is desirable to provide a perceptible indication of network connectivity.

Figure 1:
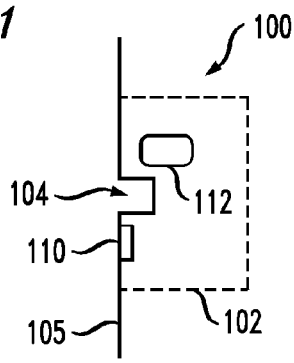
FIG. 1 shows an illustrative in-wall embodiment of an intelligent network jack for a communication network.

FIG. 1 shows an intelligent network jack 100 in an illustrative in-wall embodiment of the present invention. The network jack 100 comprises a housing 102 and an input connector 104, and is installed in a wall 105. Also included in the network jack is a display 110 and processing circuitry 112. Although not shown in the simplified drawing of FIG. 1, an output connector is also assumed to be included in the network jack 100, for coupling to a communication network via a cable or other type of connection. An example of such an output connector can be seen as element 210 in the more detailed view of FIG. 2.

The processing circuitry 112 is arranged within the housing 102 and is operative to test for connectivity between the network jack and the communication network, and the display 110 presents one or more results of the connectivity testing in a perceptible manner. The display in this embodiment comprises a liquid crystal display (LCD), although other types of displays could be used. The network jack is installed in the wall 105 with the housing 102 primarily on one side of the wall and the input connector 104 and display 110 accessible on an opposite side of the wall. The input connector 104 in this embodiment may be, for example, an RJ45 female connector, also known as an 8P8C connector.

By way of example, the processing circuitry 112 may periodically test for connectivity between the network jack 100 and the communication network at specified intervals (e.g., every few minutes). A given such test for connectivity may comprise verifying that the network jack is connected to a functioning switch or other network device of the communication network. Also, the test may involve determining an identifier of communication network, such as a subnet address of the communication network. The processing circuitry 112 is operative to control the display 110 so as to present an indication of whether or not the network jack is connected to a functioning switch or other network device of the communication network. This may involve presenting on the display 110 a subnet address or other identifier of the communication network to which the network jack is connected.

The network jack 100 is thus an intelligent jack, in that it is configured to periodically probe its own network connectivity and to continuously report the latest results on the LCD display 110. Such a network jack allows a user to visually scan many network jacks in a computer lab or other facility within a matter of seconds in order to easily and efficiently verify proper connectivity. When proper connectivity is detected, the subnet address or other network identifier may be presented on the display. If connectivity is broken, an error message (e.g., "no network") may be presented on the display.

Figure 2:
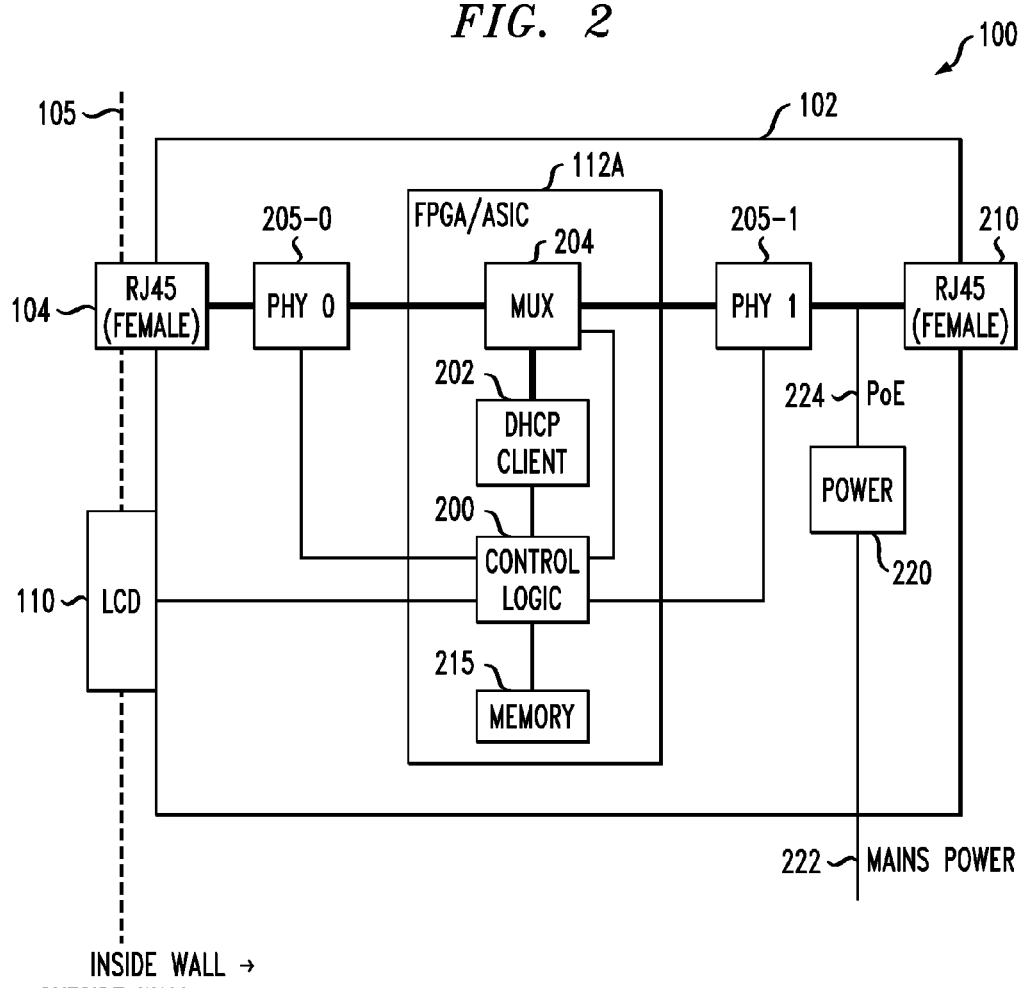
FIG. 2 shows a more detailed view of the intelligent network jack of FIG. 1.

Referring now to the more detailed view of FIG. 2, it can be seen that the processing circuitry 112 in the housing 102 of network jack 100 comprises a processor 112A coupled between the input connector 104 and the output connector 210. The processor 112A comprises control logic 200, a DHCP client 202, and a multiplexer (MUX) 204. The multiplexer 204 is configured to direct communications between the DHCP client 202 and first and second physical layer devices 205-0 and 205-1, also denoted as PHY 0 and PHY 1 in the figure, in a manner to be described in greater detail below. The first and second physical layer devices 205-0 and 205-1 are assumed to be part of the processing circuitry 112 shown in FIG. 1. The control logic 200 is coupled to the DHCP client 202 and the multiplexer 204, as well as to the display 110 and the first and second physical layer devices 205-0 and 205-1.

The processor 112A in this embodiment is implemented as a single integrated circuit, such as a field programmable gate array (FPGA) or an application-specific integrated circuit (ASIC). In other embodiments, multiple integrated circuits may be used to implement the processor 112A or, more generally, the processing circuitry 112. For example, the processor 112A may be implemented as a microprocessor or a microcontroller, as well as portions or combinations of such devices. The processor utilizes the DHCP client 202 to determine whether a DHCP address can be acquired, and if so to acquire that address. The control logic 200 controls the display 110 so as to present the acquired DHCP address.

Configuring the network jack 100 to acquire a DHCP address serves several purposes. First, many of the network devices that are directly or indirectly plugged into jacks must acquire their addresses via DHCP, and therefore verifying DHCP functionality is important. Second, if DHCP functionality works, then that is a very good indication that proper network connectivity exists. Third, it is sometimes the case that a network can become misconfigured in a way that causes a DHCP server to issue addresses that do not match the subnet on which the network jack is located, and by having the network jack acquire a DHCP address it can easily spot such misconfigurations. Finally, by having the network jack acquire a DHCP address, the jack itself becomes a network device that can be pinged from any location. This allows a network administrator or technician to test all the network jacks in a given facility without even entering the facility.

As noted above, the input connector 104 in this embodiment may be, for example, an RJ45 female connector. The output connector 210 may also be implemented as an RJ45 female connector. Other types of connectors may be used in other embodiments.

The processor 112A as shown in FIG. 2 further comprises a memory 215 that may be implemented as, for example, an electronic random access memory (RAM), a read-only memory (ROM), or other type of storage device, as well as portions or combinations of such devices. The memory 215 may be used to store one or more software programs that are executed by the processor 112A in performing connectivity tests, displaying results of such tests, and performing other related operations. Aspects of the invention may therefore be implemented at least in part using such software programs. The memory 215 may be viewed as an example of what is more generally referred to herein as a computer program product or still more generally as a computer-readable storage medium that has executable program code embodied therein.

As is apparent from the foregoing, the processor 112A may comprise well-known conventional circuitry suitably modified to operate in the manner described herein. Conventional aspects of such circuitry are well known to those skilled in the art and therefore will not be described in detail herein.

The operation of the network jack 100 of FIG. 2 will now be described in greater detail. In the figure, thick lines denote Ethernet packet flow, thin lines denote either control or power, and the dashed line denotes the wall 105 through which the network jack is installed. The input connector 104 is an RJ45 female connector into which a user plugs his or her computer or other equipment. The output connector 210 is an RJ45 female connector into which an Ethernet cable that runs behind the wall 105 is plugged. The input and output connectors 104 and 210 are connected to the respective PHY 0 and PHY 1 devices, each of which may be implemented as a separate integrated circuit. In the left-to-right direction in the figure, the multiplexer 204 merges all Ethernet traffic coming from PHY 0 and the DHCP client 202 and sends that merged traffic to PHY 1. In the right-to-left direction, the multiplexer 204 inspects all Ethernet packets coming from PHY 1. If a given Ethernet packet is addressed to the DHCP client 202, then the multiplexer 204 sends it there, and otherwise the multiplexer sends the packet to PHY 0. The DHCP client 202 implements the client side of the DHCP protocol, and attempts to interact with a DHCP server in the network. As mentioned previously, both of the PHY devices 205-0 and 205-1, as well as the multiplexer 204 and DHCP client 202, are under the control of the control logic 200, which is also responsible for displaying the current state of the network jack on the LCD 110.

Power is supplied to the network jack 100 via a power supply 220 that has as its power source one or both of mains power 222 or power over Ethernet (PoE) 224. Other types of power sources, such as rechargeable batteries, may additionally or alternatively be used. For example, in a given embodiment such a battery could be configured to recharge whenever mains power or PoE is available.

It is to be appreciated that an intelligent network jack as disclosed herein may be implemented using components and modules other than those specifically shown in the exemplary arrangement of FIG. 2.

Figure 3:
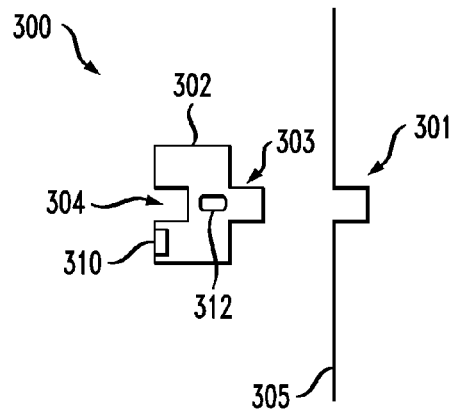
FIG. 3 shows an illustrative adaptor embodiment of an intelligent network jack for a communication network.

One possible alternative network jack embodiment will now be described with reference to FIGS. 3 and 4. In this embodiment, an adaptor network jack 300 is configured for insertion into an input connector of a conventional in-wall network jack 301, as shown in FIG. 3. The network jack 300 comprises a housing 302, an output connector 303 and an input connector 304, with the output connector being configured for insertion into the conventional jack 301 installed in a wall 305. Also included in the network jack 300 is a display 310 and processing circuitry 312.

Figure 4:
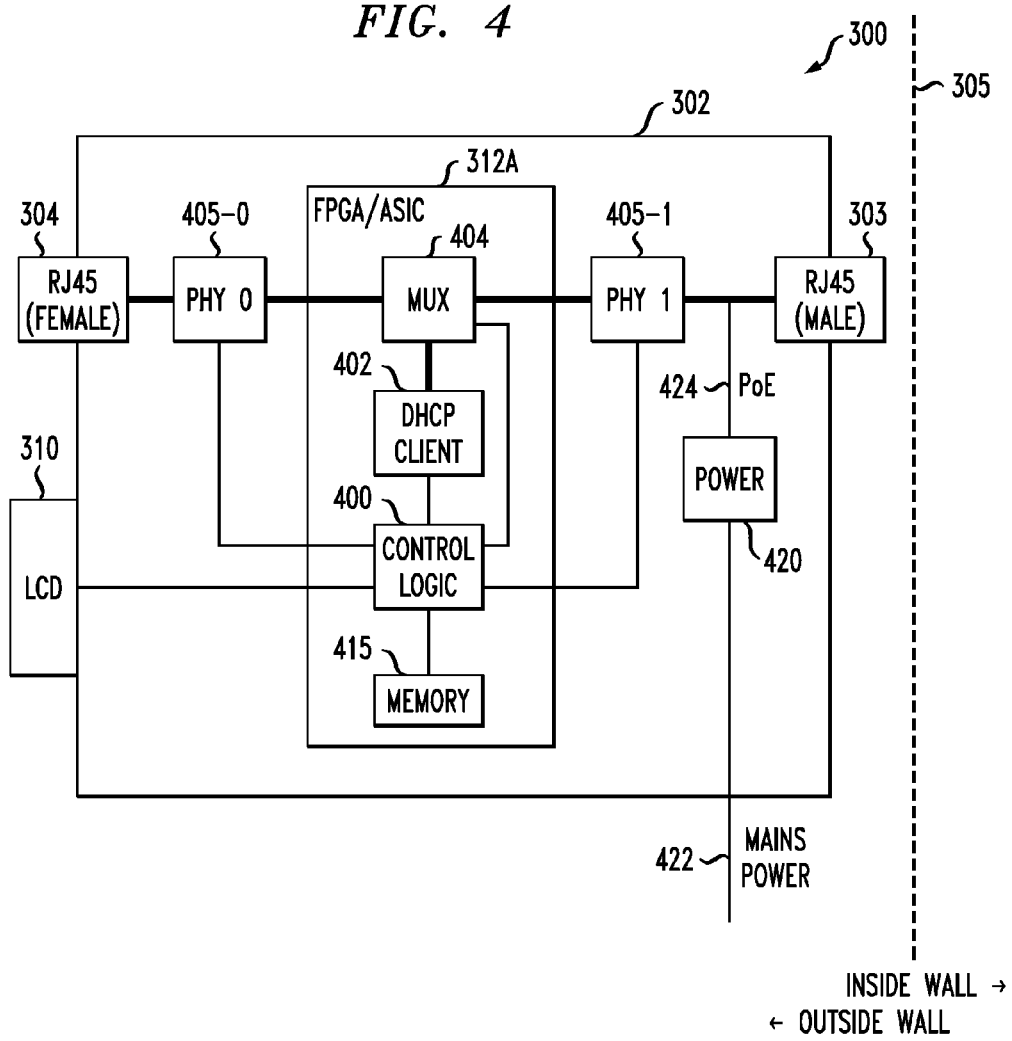
FIG. 4 shows a more detailed view of the intelligent network jack of FIG. 3.

FIG. 4 shows a more detailed view of the network jack 300. It can be seen from this view that the input connector 304 comprises an RJ45 female connector and the output connector 303 comprises an RJ45 male connector. Also, the processing circuitry 312 includes a processor 312A including control logic 400, DHCP client 402, multiplexer 404 and memory 415. The processing circuitry 312 further includes PHY devices 405-0 and 405-1. Finally, network jack 300 includes power supply 420 which is driven by one or both of mains power 422 and PoE 424. These elements of network jack 300 operate in substantially the same manner as the corresponding elements of network jack 100, as previously described. However, the adaptor network jack 300 is able to plug into an existing conventional in-wall jack, thereby providing the desired functionality without requiring replacement of the existing in-wall jack. To prevent confusion, FIG. 4 does not show the wall-mounted female RJ45 jack 301 into which the adapter is intended to be plugged.

Again, it is to be appreciated that alternative configurations of the network adaptor housing, display, connectors and other elements may be used in other embodiments.

Figure 5:
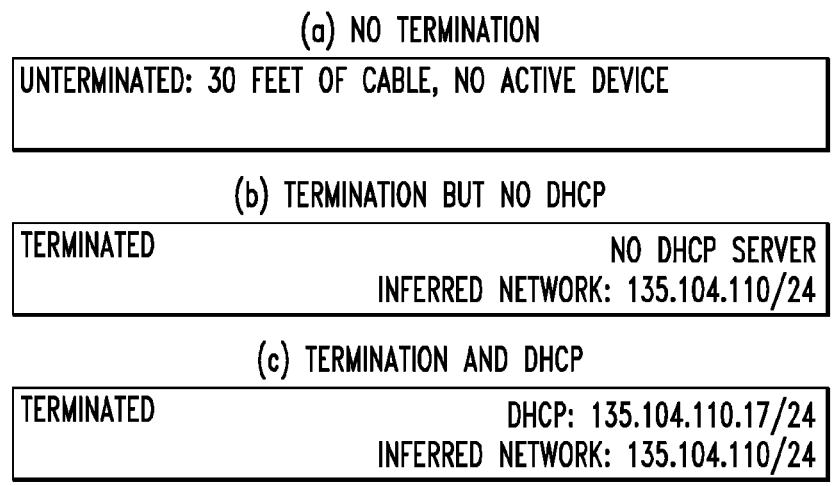
FIG. 5 shows a number of examples of perceptible displays that may be generated by the intelligent network jack of FIG. 1 or FIG. 3.

FIG. 5 shows example screen shots that may be presented on the display 110 or 310 of the intelligent network jack of FIG. 1 or FIG. 3.

FIG. 5(a) more particularly shows what may be displayed when the network jack has no termination, for example, when there is no Ethernet cable connected to the output RJ45 connector 210 or 303, or there is a cable but it is broken or impaired in some way, or there is an unimpaired cable but that cable is not plugged into an active network device on the other end. As shown, the display in this case may present the detected length of cable (e.g., 30 feet of cable), as well as an indication that there is no active network device connected to the cable.

FIG. 5(b) shows what may be displayed when the network jack has termination, but is unable to acquire a DHCP address for some reason. The display in this case indicates that there is no DHCP server. The "inferred network" shown on the display is the network that the control logic 200 or 400 infers that the network jack is connected to, based on a heuristic analysis of the Ethernet packets arriving at the network jack. In this example, the inferred network is identified as 135.104.110/24.

FIG. 5(c) shows what may be displayed when the network jack has termination and is able to acquire a DHCP address. In this case, the display indicates both the acquired DHCP address, which is 135.104.110.17/24, and the inferred network.

It should be emphasized that the screen shots of FIG. 5 are illustrative only. Other display formats, with different display contents, are implementable in a straightforward manner by one skilled in the art, via an appropriate modification of the control logic or other functionality of the network jack.

Figure 6:
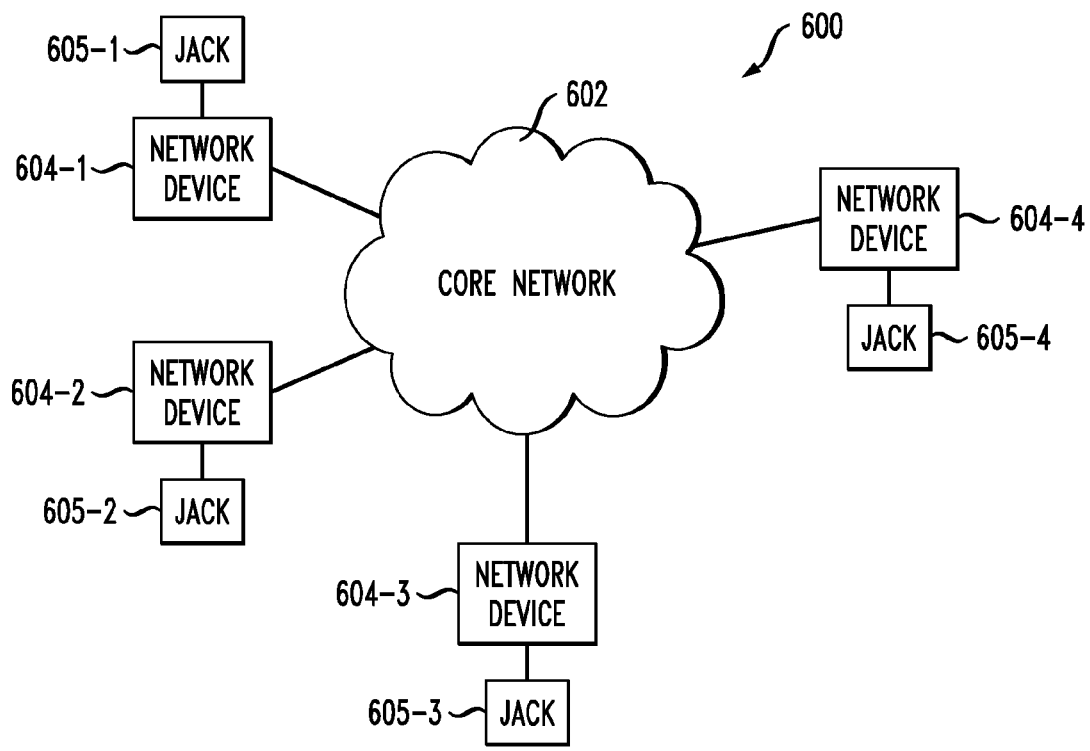
FIG. 6 shows a communication network incorporating multiple ones of the intelligent network jack of FIG. 1 or FIG. 3.

Network jacks of the type described herein can be deployed at various user interface points in a communication network. FIG. 6 illustrates such an arrangement. A communication network 600 comprises a core network 602 and additional network devices 604-1 through 604-4. Associated with each of the additional network devices 604 is a corresponding intelligent network jack 605, which may represent in-wall network jack 100 or adaptor network jack 300 as previously described. Each of the network jacks 605 therefore comprises processing circuitry configured to test connectivity of the network jack to at least one of the network devices 604, and a display for presenting a result of said test in a perceptible manner. The network may comprise any type of communication network suitable for transporting data or other signals, and the invention is not limited in this regard. For example, the core network 602 may comprise a wide area network such as the Internet, a metropolitan area network, a local area network, a cable network, a telephone network, a satellite network, as well as portions or combinations of these or other networks. The term "network" as used herein is therefore intended to be broadly construed.

The in-wall and adaptor network jacks 100 and 300 in the illustrative embodiments automatically perform connectivity testing in an accurate and efficient manner without the excessive cost and delay associated with use of conventional network testers and without requiring the intervention of a network administrator or technician. The test results are presented on the jack itself in a manner that allows users to easily detect and diagnose connectivity problems. The testing is advantageously carried out in the administrative domain of the user so as to enable the user to determine when and where to test.

It should again be emphasized that the embodiments described above are presented by way of illustration only, and should not be interpreted as limiting in any way. Other embodiments may use different types of housings, displays, connectors and processing circuitry, depending on the needs of the particular application. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A network jack configured for connection to a communication network, comprising:

a housing;
an input connector;
an output connector for coupling to the communication network;
processing circuitry arranged within the housing and configured to perform a test for connectivity between the network jack and the communication network; and
a display for presenting a result of said test in a perceptible manner;
wherein the network jack comprises an in-wall network jack configured for installation with said housing primarily on one side of a wall and with at least the input connector and display accessible on an opposite side of the wall; and
wherein the processing circuitry is further configured to periodically test for connectivity between the network jack and the communication network at specified intervals.

2. The network jack of claim 1 wherein the input connector comprises an RJ45 female connector and the output connector comprises an RJ45 female connector.

3. The network jack of claim 1 wherein the processing circuitry comprises:
a processor coupled between the input connector and the output connector;
a first physical layer device coupled between the input connector and the processor; and
a second physical layer device coupled between the processor and the output connector.

4. The network jack of claim 3 wherein the processor further comprises:
a dynamic host configuration protocol client;
a multiplexer for directing communications between the dynamic host configuration protocol client and the first and second physical layer devices; and
control logic coupled to the dynamic host configuration protocol client and the multiplexer.

5. The network jack of claim 1 wherein said test for connectivity comprises verifying that the network jack is connected to a functioning network device of the communication network.

6. The network jack of claim 1 wherein said test for connectivity comprises determining an identifier of the communication network.

7. The network jack of claim 6 wherein said identifier comprises a subnet address of the communication network.

8. The network jack of claim 1 wherein said test for connectivity comprises:
determining whether a dynamic host configuration protocol address can be acquired; and
if the dynamic host configuration protocol address can be acquired, acquiring said address.

9. The network jack of claim 1 wherein said processing circuitry is configured to control said display to present an indication of whether or not the network jack is connected to a functioning network device of the communication network.

10. The network jack of claim 1 wherein said processing circuitry is configured to control said display to present a subnet address of the communication network.

11. The network jack of claim 1 wherein said processing circuitry is configured to control said display to present an acquired dynamic host configuration protocol address.

12. The network jack of claim 1 wherein said processing circuitry is configured to control said display to present an inferred network address with said inferred network address being inferred from one or more packets received in the network jack.

13. The network jack of claim 1 wherein said processing circuitry is configured to control said display to present an indication that no dynamic host configuration protocol server has been detected.

14. A network jack configured for connection to a communication network, comprising:
a housing;
an input connector;
an output connector for coupling to the communication network;
processing circuitry arranged within the housing and configured to perform a test for connectivity between the network jack and the communication network; and
a display for presenting a result of said test in a perceptible manner;
wherein the network jack comprises an adaptor network jack with said output connector configured for insertion into an input connector of a second network jack that comprises an in-wall network jack; and
wherein the processing circuitry is further configured to periodically test for connectivity between the network jack and the communication network at specified intervals.

15. The network jack of claim 14 wherein the input connector comprises an RJ45 female connector and the output connector comprises an RJ45 male connector.

16. An apparatus comprising:
an integrated circuit comprising processing circuitry configured for use in determining connectivity of a network jack in which the integrated circuit is installed, the network jack being configured for connection to a communication network;
wherein the processing circuitry is configured to perform a test for connectivity between the network jack and the communication network, and to control a display of the network jack for presenting a result of said test in a perceptible manner;
wherein the processing circuitry is arranged in a housing of the network jack;
wherein the network jack comprises an in-wall network jack configured for installation with said housing primarily on one side of a wall and with at least an input connector and the display accessible on an opposite side of the wall; and
wherein the processing circuitry is further configured to periodically test for connectivity between the network jack and the communication network at specified intervals.

17. A communication network comprising:
a plurality of interconnected network devices; and
a plurality of network jacks each configured for connection to one or more of the network devices;
wherein each of the network jacks comprises processing circuitry configured to perform a test for connectivity of the network jack to at least one of the network devices, and a display for presenting a result of said test in a perceptible manner;
wherein the processing circuitry is arranged in a housing of the network jack;
wherein a given one of the network jack comprises an in-wall network jack configured for installation with said housing primarily on one side of a wall and with at least an input connector and the display accessible on an opposite side of the wall; and wherein the processing circuitry is further configured to periodically test for connectivity between the network jack and the communication network at specified intervals.

18. A method for use in a network jack configured for connection to a communication network, the method comprising:

performing a test within the network jack to determine connectivity between the network jack and at least one network device of the communication network; and presenting a result of said test in a perceptible manner on a display of the network jack;

wherein the network jack comprises processing circuitry for performing the test arranged in a housing of the network jack;

wherein the network jack comprises an in-wall network jack configured for installation with said housing primarily on one side of a wall and with at least an input connector and the display accessible on an opposite side of the wall; and wherein the processing circuitry is configured to periodically test for connectivity between the network jack and the communication network at specified intervals.

\* \* \* \* \*